July 26, 1932.   F. H. BRITTAIN   1,868,877
LIGHT SENSITIVE DEVICE
Filed Dec. 16, 1930
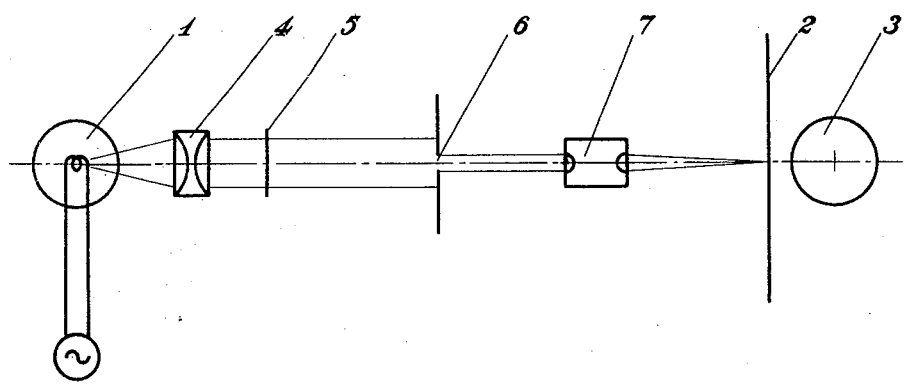
Inventor.
Francis H. Brittain
N. H. Lockwood
Attorney.

Patented July 26, 1932

1,868,877

UNITED STATES PATENT OFFICE

FRANCIS HUGH BRITTAIN, OF PINNER WOOD, PINNER, ENGLAND

LIGHT SENSITIVE DEVICE

Application filed December 16, 1930, Serial No. 502,872, and in Great Britain December 27, 1929.

This invention relates to the illumination of objects of which the varying properties are to be translated into corresponding electrical variations.

In the use of talking films a beam of light is transmitted through the film and received on a photoelectric cell; variations in the density of the film or in the width of a strip of constant density cause variations in the current through the cell and after suitable amplification, these current variations are made to operate a loud speaker. If the source emitting the beam of light is not constant, the variations of the source will be superimposed on the variations of the density of the film, and will give rise to parasitic noises. If the source is an electric incandescent lamp run by alternating current with a frequency of 50 cycles or less, the temperature of the filament, and therefore the amount of light emitted, will vary appreciably with the instantaneous value of the current. Accordingly there will be a flicker of the lamp which, though it is invisible to the eye, may cause a hum in the loud speaker.

This hum will be the less, the less is the variation of the temperature of the filament and the less is the variation of the amount of light with that temperature. Variation of the amount of light with the temperature can be reduced by using only that part of the radiation from the filament which is of comparatively long wave-length; for it is well known that at the temperatures prevailing in electric incandescent lamps the short wave length radiation varies much more rapidly with the temperature than the long wave length radiation.

If potassium photoelectric cells are used to detect the variations of the light, it is impossible to use any light except that in the neighbourhood of $0.45\mu$; for it is only to this light that such cells are appreciably sensitive. But photoelectric cells are now known in which the greater part of the response to a gasfilled electric incandescent lamp arises from the light of wave-length greater than $0.7\mu$. When such cells are used, the hum due to flicker may be greatly reduced without serious sacrifice in efficiency by excluding all light of wave length less than $0.7\mu$, for example, by means of filters.

According to the invention variations in the output of a light sensitive device due to the flicker of an illuminating incandescent source fed by alternating current are reduced by excluding from the light sensitive device that part of the radiation from the source which is of comparatively short wave length. It is preferable to exclude all or most of the radiation having a wave length less than some limit not less than $0.5\mu$. In practice it seems generally to be convenient if the limit lies between 0.65 and $0.8\mu$.

For example, in one arrangement in accordance with the invention, shown in the accompanying drawing, light from a 12 volt 60 watt gas-filled projection lamp 1 supplied by alternating current is projected through the sound track of a talking film 2 and then falls on a photoelectric cell 3 which is sensitive to radiation at the red end of the spectrum, a suitable cell being that known commercially as the C. M. G. 8 cell. The light from the lamp 1 passes to the film 2 through a condenser 4. a filter 5, a slit 6 and a microobjective 7, which forms a reduced image of the slit 6 on the film 2. The filter 5, which may be placed anywhere between the lamp 1 and the cell 3, is a Wratten filter No. 89A and comprises two sheets of glass cemented together with a layer of dyed gelatine in between the two sheets, and cuts off light of wave length shorter than $0.68\mu$. Such an arrangement will operate satisfactorily when the lamp is supplied with alternating current at 50 cycles.

Though the invention has been described with reference to talking films, it must be understood that it is applicable to any apparatus in which the electrical signals are caused to vary with the optical properties of an object by means of photoelectric cells and a source of thermal radiation. The term photoelectric cell is used here to include all devices in which the incidence of radiation of any wave length between $10\mu$ and $0.1\mu$ produces electrical changes.

What I claim is:—

1. A method of reducing undesirable variations in the output current of a light sensitive device, the said variations being produced by the flicker of an illuminating incandescent source fed by alternating current, which method comprises the step of excluding from the said light sensitive device that part of the radiation from the said incandescent source which is of relatively short wavelength.

2. A method of reducing undesirable variations in the output current of a light sensitive device, produced by variations of an illuminating incandescent source fed by alternating current, which method comprises the step of excluding from the said light sensitive device that part of the radiation from the said incandescent source which is of wavelength less than $0.5\mu$.

3. In apparatus for producing electric current variations including a photoelectric cell, an illuminating incandescent source therefor, and an alternating current supply for the said incandescent source, means for reducing undesirable variations in the output current caused by the said alternating current supply, comprising a light filter adapted to exclude radiation of wavelength shorter than $0.5\mu$ and a photoelectric cell sensitive to radiation at the red end of the spectrum.

4. Apparatus for reducing undesirable variations in the output of a photoelectric cell due to an alternating current supply in the reproduction of sound from a sound film record, comprising an electric incandescent lamp, a source of alternating current therefor, a sound film record, a light filter excluding light of wavelength less than $0.68\mu$ and a photoelectric cell sensitive to radiation at the red end of the spectrum.

FRANCIS HUGH BRITTAIN.